US010210333B2

(12) United States Patent
Smith, II et al.

(10) Patent No.: US 10,210,333 B2
(45) Date of Patent: Feb. 19, 2019

(54) SECURE INDUSTRIAL CONTROL PLATFORM

(71) Applicant: General Electric Company, Schenectady, NY (US)

(72) Inventors: William David Smith, II, Niskayuna, NY (US); Safayet Nizam Uddin Ahmed, Niskayuna, NY (US); Joseph Czechowski, III, Niskayuna, NY (US); David Safford, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 260 days.

(21) Appl. No.: 15/198,281

(22) Filed: Jun. 30, 2016

(65) Prior Publication Data

US 2018/0004953 A1    Jan. 4, 2018

(51) Int. Cl.
  *G06F 21/57*   (2013.01)
  *G06F 21/78*   (2013.01)
  (Continued)

(52) U.S. Cl.
  CPC ........ *G06F 21/575* (2013.01); *G06F 9/45558* (2013.01); *G06F 21/57* (2013.01);
  (Continued)

(58) Field of Classification Search
  CPC ............ G06F 21/575; G06F 2221/034; H04L 63/1441; H04L 63/20; H04L 9/0897; H04L 9/3268; H04L 9/45558
  See application file for complete search history.

(56) References Cited

U.S. PATENT DOCUMENTS

| 7,216,369 B2 * | 5/2007 | Wiseman ................. G06F 21/57 713/193 |
| 7,380,119 B2 * | 5/2008 | Bade ......................... G06F 21/53 713/155 |

(Continued)

FOREIGN PATENT DOCUMENTS

| CN | 102438026 A | * | 5/2012 |
| CN | 104573516 A | * | 4/2015 |

(Continued)

OTHER PUBLICATIONS

Arthur, W. et al., "Quick tutorial on TPM 2.0," A practical guide to TPM 2.0, pp. 23-37, (2015).

(Continued)

*Primary Examiner* — Eleni A Shiferaw
*Assistant Examiner* — Sher A Khan
(74) *Attorney, Agent, or Firm* — GE Global Patent Operation; Nitin Joshi

(57) ABSTRACT

According to some embodiments, an overall chain-of-trust may be established for an industrial control system. Secure hardware may be provided, including a hardware security module coupled to or integrated with a processor of the industrial control system to provide a hardware root-of-trust. Similarly, secure firmware associated with a secure boot mechanism such that the processor executes a trusted operating system, wherein the secure boot mechanism includes one or more of a measured boot, a trusted boot, and a protected boot. Objects may be accessed via secure data storage, and data may be exchanged via secure communications in accordance with information stored in the hardware security model.

15 Claims, 11 Drawing Sheets

(51) Int. Cl.
  *G06F 9/455* (2018.01)
  *H04L 9/08* (2006.01)
  *H04L 9/32* (2006.01)
  *H04L 29/06* (2006.01)

(52) U.S. Cl.
  CPC ............ *G06F 21/78* (2013.01); *H04L 9/0897* (2013.01); *H04L 9/3268* (2013.01); *H04L 63/1441* (2013.01); *H04L 63/20* (2013.01); *G06F 2009/45562* (2013.01); *G06F 2221/034* (2013.01); *H04L 2209/127* (2013.01)

(56) References Cited

U.S. PATENT DOCUMENTS

| | | | | |
|---|---|---|---|---|
| 7,836,299 | B2* | 11/2010 | England | G06F 21/57 713/162 |
| 7,849,312 | B2 | 12/2010 | Maletsky et al. | |
| 8,006,100 | B2* | 8/2011 | King | G06F 21/575 713/168 |
| 8,272,002 | B2 | 9/2012 | Molina et al. | |
| 8,832,452 | B2* | 9/2014 | Johnson | G06F 21/10 713/182 |
| 2002/0199123 | A1 | 12/2002 | McIntyre et al. | |
| 2005/0257073 | A1* | 11/2005 | Bade | G06F 21/575 713/193 |
| 2006/0041936 | A1* | 2/2006 | Anderson | H04L 63/02 726/11 |
| 2007/0192867 | A1* | 8/2007 | Miliefsky | H04L 63/20 726/25 |
| 2009/0165132 | A1* | 6/2009 | Jain | G06F 21/51 726/22 |
| 2011/0320823 | A1 | 12/2011 | Saroiu et al. | |
| 2012/0265975 | A1* | 10/2012 | Kimelman | G06F 21/53 713/1 |
| 2012/0317627 | A1* | 12/2012 | Chandrashekhar | G06F 21/577 726/4 |
| 2014/0215602 | A1* | 7/2014 | Chuaprasort | G06Q 30/02 726/20 |
| 2015/0012748 | A1* | 1/2015 | Jiang | G06F 21/6209 713/168 |
| 2015/0074764 | A1* | 3/2015 | Stern | H04L 63/06 726/4 |
| 2015/0186668 | A1* | 7/2015 | Whaley | G06F 21/6218 713/156 |
| 2016/0048694 | A1* | 2/2016 | Martinez | G06F 21/606 713/193 |
| 2016/0191253 | A1* | 6/2016 | Pyle | H04L 9/3263 380/28 |
| 2017/0324733 | A1* | 11/2017 | Howry | G06F 21/577 |

FOREIGN PATENT DOCUMENTS

| | | | | |
|---|---|---|---|---|
| EP | 2 866 407 | A1 | 4/2015 | |
| EP | 2866407 | A1 * | 4/2015 | ......... H04L 63/0209 |

OTHER PUBLICATIONS

International Search Report and Written Opinion issued in connection with corresponding PCT Application No. PCT/US2017/039486 dated Aug. 23, 2017.

Berger, Stefan et al. "vTPM: Virtualizing the Trusted Platform Module", USENIX Association, Security '06: 15th USENIX Security Symposium, May 12, 2006, https://www.usenix.org/legacy/event/sec06/tech/full_papers/berger/berger_html/, (pp. 305-320, 16 total pages).

"Method to migrate the Platform Configuration Registers in TPM hardware", "The IP.com Prior Art Database", Jan. 16, 2013, 2pgs.

* cited by examiner

SECURE INDUSTRIAL CONTROL PLATFORM

BACKGROUND

The subject matter disclosed herein relates to industrial control systems and, more particularly, to securing the operation of industrial control systems.

Industrial control systems, such as power generation and transmission systems (e.g., wind, water, and gas turbine systems) and manufacturing systems (e.g., petroleum refineries, chemical manufacturing plants, and the like) are a common feature of modern industry. For such industrial control systems, an industrial controller may generally control the operation of the system. For example, certain devices in the industrial control system (e.g., sensors, pumps, valves, actuators, and the like) may be controlled by, and may report data to, the industrial controller. Furthermore, the industrial controller may execute instructions (e.g., firmware and/or applications) that may generally enable the industrial controller to control the operation of the industrial control system (e.g., a gas turbine system). These instructions may be provided by the manufacturer of the industrial controller. For example, these instructions may be loaded onto the industrial controller before it is installed in the industrial control system. Additionally, industrial controller may offer several different methods of accessing and/or providing instructions to the industrial controller, such as via a network connection or a local port.

If an unauthorized party were able to gain access to an industrial controller (either physically or through a communications network), the security of the entire industrial control platform might be compromised. For example, the unauthorized party might alter software such that operation of an industrial asset is degraded and/or possibly damage the asset. It would therefore be desirable to provide systems and methods to provide an overall chain-of-trust for an industrial control platform.

SUMMARY

According to some embodiments, an overall chain-of-trust may be established for an industrial control system. Secure hardware may be provided, including a hardware security module coupled to or integrated with a processor of the industrial control system to provide a hardware root-of-trust. Similarly, secure firmware associated with a secure boot may be provided such that the processor executes a trusted operating system, wherein the secure boot mechanism includes one or more of a measured boot, a trusted boot, and a protected boot. Objects may be accessed via secure data storage, and data may be exchanged via secure communications in accordance with information stored in the hardware security model.

Some embodiments comprise: means for providing secure hardware, including a hardware security module coupled to or integrated with a processor of the industrial control system to provide a hardware root-of-trust; means for providing secure firmware associated with a secure boot mechanism such that the processor executes a trusted operating system, wherein the secure boot mechanism includes one or more of a measured boot, a trusted boot, and a protected boot; means for accessing objects via secure data storage; and means for exchanging data via secure communications in accordance with information stored in the hardware security model.

Some technical advantages of some embodiments disclosed herein are improved systems and methods to create an overall chain-of-trust for an industrial control platform.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
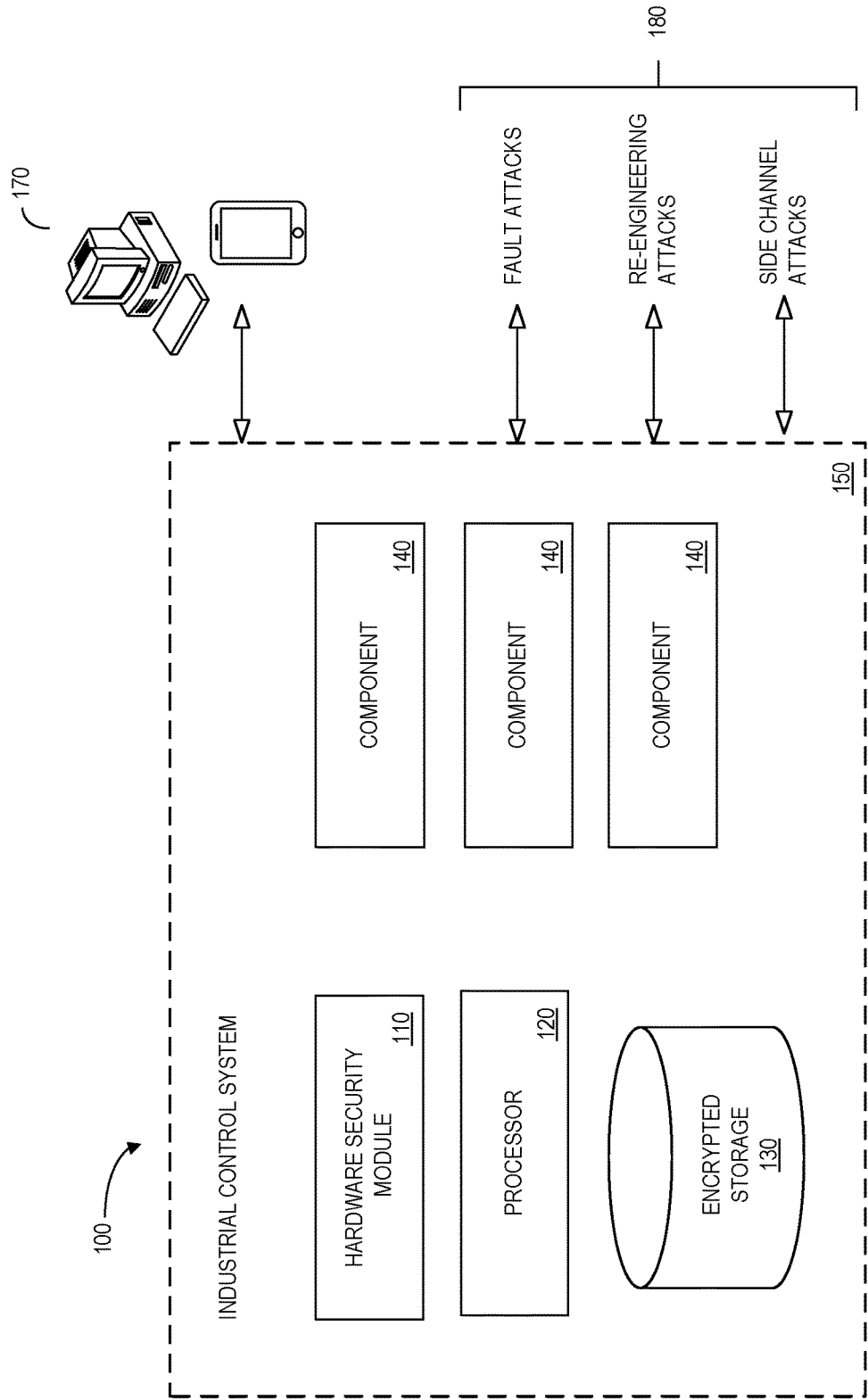
FIG. 1 is a high-level architecture of a system in accordance with some embodiments.

It may generally be desirable to operate an industrial controller of an industrial control system in a secure fashion. That is, it may generally be desirable to impose a number of restrictions on the typical behavior or operations of the industrial controller in order to improve the overall security of the industrial control system. For example, as set forth in detail below, operating the industrial controller in a secure fashion may generally block the execution of unauthorized executable files and/or block access to the industrial controller by unauthorized persons or systems. With the foregoing in mind, FIG. 1 is a high-level architecture of a system 100 in accordance with some embodiments. The system 100 includes an industrial control system 150 that includes a hardware security module 110, a processor 120, an optional encrypted storage 130 (e.g., an encrypted file system), and a number of components 140. Data in the encrypted storage 130 might include, for example, one or more objects that can be accessed using a symmetric key stored in the hardware security module 110.

The industrial control system 150 may, according to some embodiments, automatically access the encrypted storage 130 to execute a trusted Operating System ("OS") to configure the components 140 for an industrial asset. As used herein, the term "automatically" may refer to, for example, actions that can be performed with little or no human intervention. An operator of the industrial control system 150 may use a remote terminal or device 170 for authorized access. Moreover, an unauthorized party might attempt to damage the industrial control system 150 via one or more attacks 180, such as fault attacks, re-engineering attacks, side channel attacks, etc.

As used herein, devices, including those associated with the industrial control system 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The industrial control system 150 may store information into and/or retrieve information from various data sources, such as the encrypted storage 130 and/or operator platforms 170. The various data sources may be locally stored or reside remote from the industrial control system 150. Although a single industrial control system 150 is shown in FIG. 1, any number of such devices may be included in the system 100. Moreover, various devices described herein might be combined according to embodiments of the present invention. For example, in some embodiments, the industrial control system 150 and one or more data sources might comprise a single apparatus. The industrial control system 150 function may be performed by a constellation of networked apparatuses, in a distributed processing or cloud-based architecture.

Figure 2:
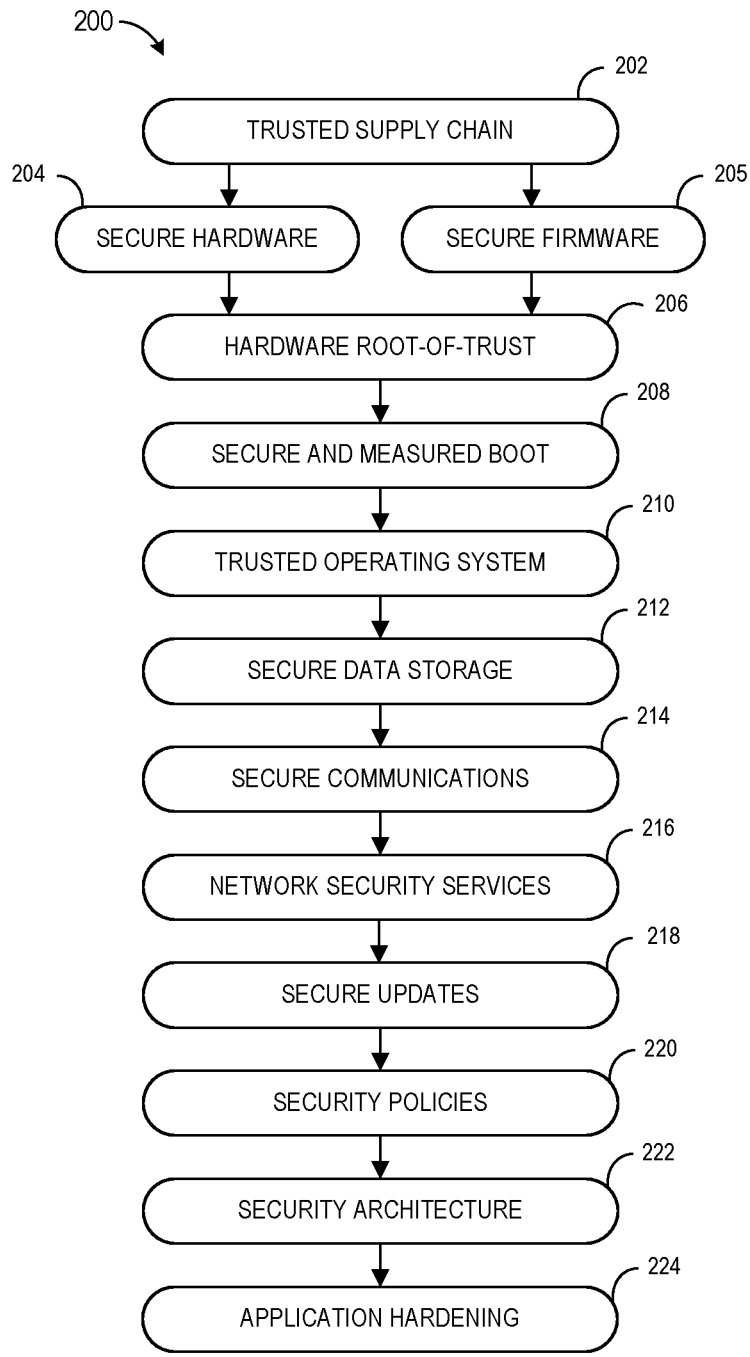
FIG. 2 illustrates elements of a secure development lifecycle for an industrial control system according to some embodiments.

To secure the industrial control system 150, a secure development lifecycle might be implemented. For example, FIG. 2 illustrates elements of a secure development lifecycle 200 for an industrial control system according to some embodiments. In particular, the lifecycle 200 may include some or all of the follow elements (each of which will be described in greater detailed herein): a trusted supply chain 202; hardware design 204; firmware design 205; a hardware root-of-trust 206; a secure and measured boot 208; a trusted OS 210; secure data storage 212; secure communications 214; network security services 216; secure updates 218; security policies 220; security architecture 222; and/or application hardening 224.

In some way, some embodiments may provide a unique stack of trusted compute capability, extending security technologies into new platforms, and extending a hardware root of trust into hypervisor hosted virtual machines. These capabilities may offer a unique defense in depth control solution that pushes the security perimeter into the individual control components and software stacks. Note that industrial control system provider may establish a secure chain of trust from the supply chain 202 and sourcing of components, through the design of hardware 204 and firmware 205 to the run-time implementation of a complete chain of trust from hardware through to application software, communications 214, and systems integration. Some embodiments may leverage a number of open standards and existing security technologies, and apply these security technologies to industrial control systems.

Some of the foundational security standards may include those provided by the Trusted Computing Group ("TCG") in the form of Trusted Platform Module ("TPM") devices. TPM devices may ground a root-of-trust in an industrial control system in a tamper hardened device. Note that TPM devices may be as a root-of-trust for measurement and/or for sealing and protecting platform secrets (e.g., encryption keys used for secure local storage and for device authentication). Access to such secrets may then be tied to the integrity measurements associated with the platform.

Note that microprocessors used in the embedded control systems are now integrating security features into the silicon. For example, most processor companies (e.g., Intel, AMD, ARM, etc.) build core security technologies into processors. Traditionally, the security of a system addresses Confidentiality, Integrity and Availability (referred to as "CIA"). Cryptographic technologies (e.g., various encryption algorithms, cryptographic hashes, digital signatures, etc.) may help insure confidentiality and integrity of a system. Availability covers scenarios where an adversary attacks a system by denying legitimate entities access to information and services. Attacks such as network denial-of-service attacks fall in to this category. Such attacks may focus on network and physical security of the control system.

Figure 3:
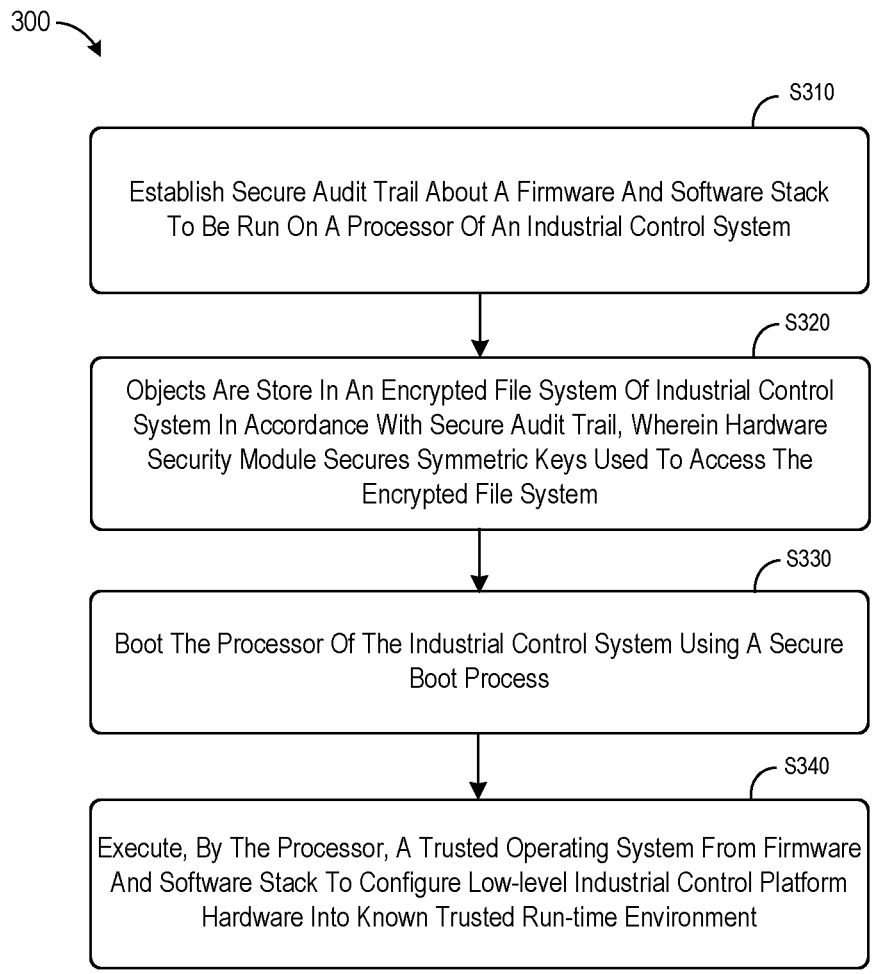
FIG. 3 illustrates a method that might be performed according to some embodiments.

FIG. 3 illustrates a method 300 that might be performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a secure audit trail about a firmware and software stack to be run on a processor of the industrial control system may be established. At S320, note that objects may be stored in an encrypted store of the industrial control system in accordance with the secure audit trail. Moreover, a hardware security module coupled to or integrated with a processor of the industrial control system may secure symmetric keys used to access the encrypted storage. According to some embodiments, the hardware security module comprises a Trusted Platform Module ("TPM").

At S330, the processor of the industrial control system may be booted using a secure boot process. The secure boot process might incorporate, for example, a verified boot, a measured boot, a protected boot, and/or a trusted boot. For example, a "verified" boot might only allow signed software to run on the device. A "measured" boot may take measurements of different aspects of the hardware and boot process and then sign and securely store those measurements with the TPM. A "protected" boot might, for example, require a password.

According to some embodiments, the system may verify a correct set of platform integrity measurements collected during a measured boot of the processor. According to some embodiments, the secure boot process provides the processor with platform firmware that stores static root-of-trust measurements, needed to ensure the integrity of boot objects, in PCRs of the hardware security module to provide an audit trail. According to some embodiments, firmware may extract secrets from hardware security modules that are used to decrypt storage/boot objects. The ability to extract secretes from a hardware security module may be restricted based on the audit trail.

At S340, the processor may execute a trusted operating system from the software and firmware stack to configure low-level industrial control platform hardware into a known, trusted run-time environment. According to some embodiments, private key cryptographic operations are used by the hardware security module to facilitate device identification in secure communications. According to some embodiments, the processor may be placed in a trusted state and, after being placed in the trusted state, the processor may load and decrypt the objects from the encrypted storage to create the firmware and software stack. Moreover, the processor may execute a hypervisor to create and run virtual machines for the industrial control system. Note that a designer might select the hardware security module as dedicated security hardware for the industrial control system. Moreover, the hardware security module might be selected from a trusted supply chain component entity that implements secure development life cycle practices and utilizes firmware verification.

According to some embodiments, the industrial control system is a distributed industrial control system and the hardware security module is associated with an industrial control system controller that utilizes public key infrastructure services to issue and manage certificates for code signing of software and firmware on components of the industrial control system. Moreover, security updates for the industrial control system might be deployed using package code signing tools that include signature information integrated with run-time signature verification mechanisms with appropriate public keys and correspond to private signing keys. In addition, security policies may be implemented to facilitate confidentiality, integrity, and availability of the industrial control system. In some cases, a security architecture may treat related information that shares a security policy as a uniform security domain.

Note that applications executed by the industrial control system may be hardened against a plurality of attack vectors via implementation of network and device communications, adaptation of secure communication protocols, penetration testing, and/or third-party certification of the industrial control system in connection with the applications being executed.

Some embodiments described herein provide a chain-of-trust for Industrial Control Systems ("ICS"). Some elements that might be associated with a secure chain-of-trust for an ICS involve a number of activities and technologies outlined in FIG. 2. Each of the elements in that FIG. might, for example, comprise one or more links in the overall chain of trust. In general, the security of a system might depend on understanding the threats at each of these layers and addressing them through mitigation strategies in the system architecture, design and implementation, manufacturing, supply chain, deployment and provisioning, maintenance, end-of-life, etc.

When developing secure industrial control systems, the education, training and adoption of best practices may be used in secure software, hardware, and application development. Examples of Secure Development Life Cycle ("SDLC") approaches may include industry standards (e.g., International Electrotechnical Commission ("IEC") 62443) and/or regulations (e.g., North American Electric Reliability Corporation ("NERC")/Critical Infrastructure Protection "CIP"). In order to establish trust in an ICS, it may be helpful to establish trust in the system components and integration of these components in the ICS. In general, in order to be able to trust the system from a security perspective, it may help to ensure that all components and system configurations maintain the original integrity of the components and their respective deployment configurations. Note that any component that utilizes firmware is a potential attack vector for malware insertion. Such components range from integrated components to third-party control system elements. Examples of integrated components that have a firmware attack surface include hard disk drives, solid state drives, Secure Digital ("SD") cards, Universal Serial Bus ("USB") devices, network interface cards, Field-Programmable Gate Array ("FPGA") devices, etc. Examples of black box system components would include legacy industrial control equipment, networking routing and switching equipment, etc. Each of these elements could be compromised by modifying internal firmware. In addition, malicious hardware components may be surreptitiously added to a component or system for the purpose of compromising confidentiality, integrity or availability of that system.

Figure 4:
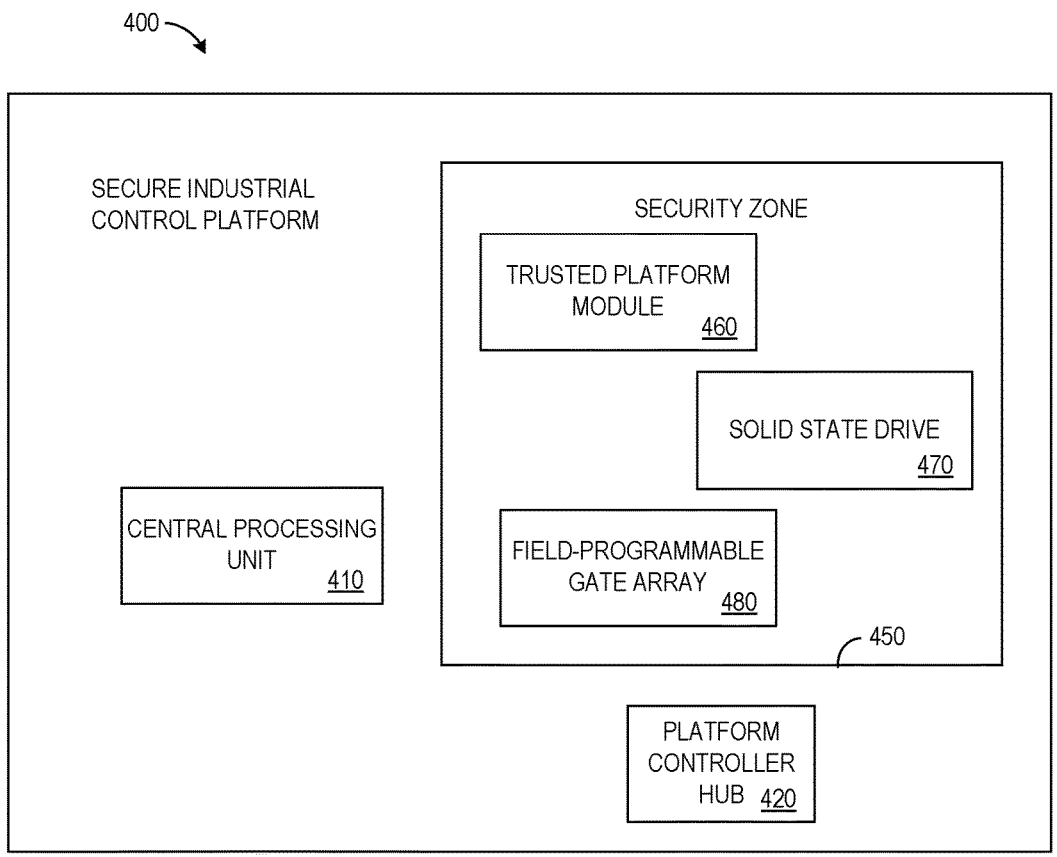
FIG. 4 illustrates a system with a security zone for an industrial control system in accordance with some embodiments.

FIG. 4 illustrates a system 400 with a security zone 450 for an industrial control system in accordance with some embodiments. The system 400 includes a CPU 410 and a Platform Controller Hub ("PCH") 420 (outside of the security zone 450). The security zone may include a "keep out zone barrier," such as a 0.1 inch barrier. Within, the security zone 450, a TPM 460, Solid State Drive ("SSD") 470, and FPGA 480 may be protected. Note that supply chain mitigation strategies may be based on establishing and vetting relationships with component suppliers, review of their respective SDLC practices and security features, reverse engineering and understanding of sourced components and the adoption of threat mitigation strategies such as firmware verification (e.g., digital code signing, attestation) along with anti-tamper and tamper-evident technologies.

In order to establish trust in ICS components, it may be helpful to review and evaluate the hardware and firmware architecture of the ICS components, to facilitate an understanding of the security threats, capabilities and features of the components used in implementing the ICS component. This may include reviewing the processor architecture(s) and other hardware components used in the design, identification of security critical components in the design and articulating the threats and associated mitigation strategies identified for the system. According to some embodiments, a security hardened device, such as a TPM device, may be used in a system to provide tamper-resistant storage for all measurements as well as to provide a secure enclave for security critical operations such as private-key cryptographic operations used to establish device identity in secure communications. Note that TPM devices may be either "integrated" TPM devices based in firmware or "discrete"

TPM devices that are distinct devices integrated and included in the hardware design and implementation for the ICS component.

Processor architecture might also be evaluated with respect to security features. According to some embodiments, a processor may include a hardware root-of-trust for verified boot, measured boot capability (through the BIOS and firmware implementation), and/or trusted boot capabilities that allow disabling and/or lock down of an attached IO device or a Joint Test Action Group ("JTAG") debugging system during system boot.

The hardware in the system may be used as a "trust anchor" to establish the root-of-trust in the system. According to some embodiments, a hardware trust anchor can be hardened and made difficult to compromise and alter to facilitate an attack against the system. Thus—by anchoring the trust in hardware—this chain of trust may be extended through secure boot technologies in to the operating systems and applications hosted on the ICS controller.

According to some embodiments, hardware roots-of-trust may be established for each of the secure boot modes. The verification root-of-trust may be based on Hardware Verified Boot ("HVB") and originates in the processor. Note that a HVB may use security information (e.g., public key or hash of the public key used to sign the firmware) to verify the integrity of the boot firmware (BIOS, U-boot, etc.) prior to transferring control to that firmware. According to some embodiments, a measurement root-of-trust begins at hardware reset and a verification process proceeds as the system boots from reset to boot firmware (e.g., BIOS) to boot loader to OS and applications. Note that some processes may lack a hardware verified boot capability, so the verification root-of-trust may instead begin in the firmware loaded from persistent memory (e.g., flash) on the ICS controller. In the scenario where the processor lacks full HVB, extra precautions might be provided to prevent tampering with the boot firmware stored in persistent memory.

The measurement root-of-trust may provide a secure audit trail about the firmware and software stack running on the ICS component. This audit trail may, according to some embodiments, be used to seal and protect platform secrets (private keys, symmetric keys) and these secrets might only be available to the platform if the set of platform measurements match expected values. These measurements might also be used to provide attestation (e.g., a process of validating that something is true) as to the integrity of hardware, firmware, and/or software on the ICS controller.

Figure 5:
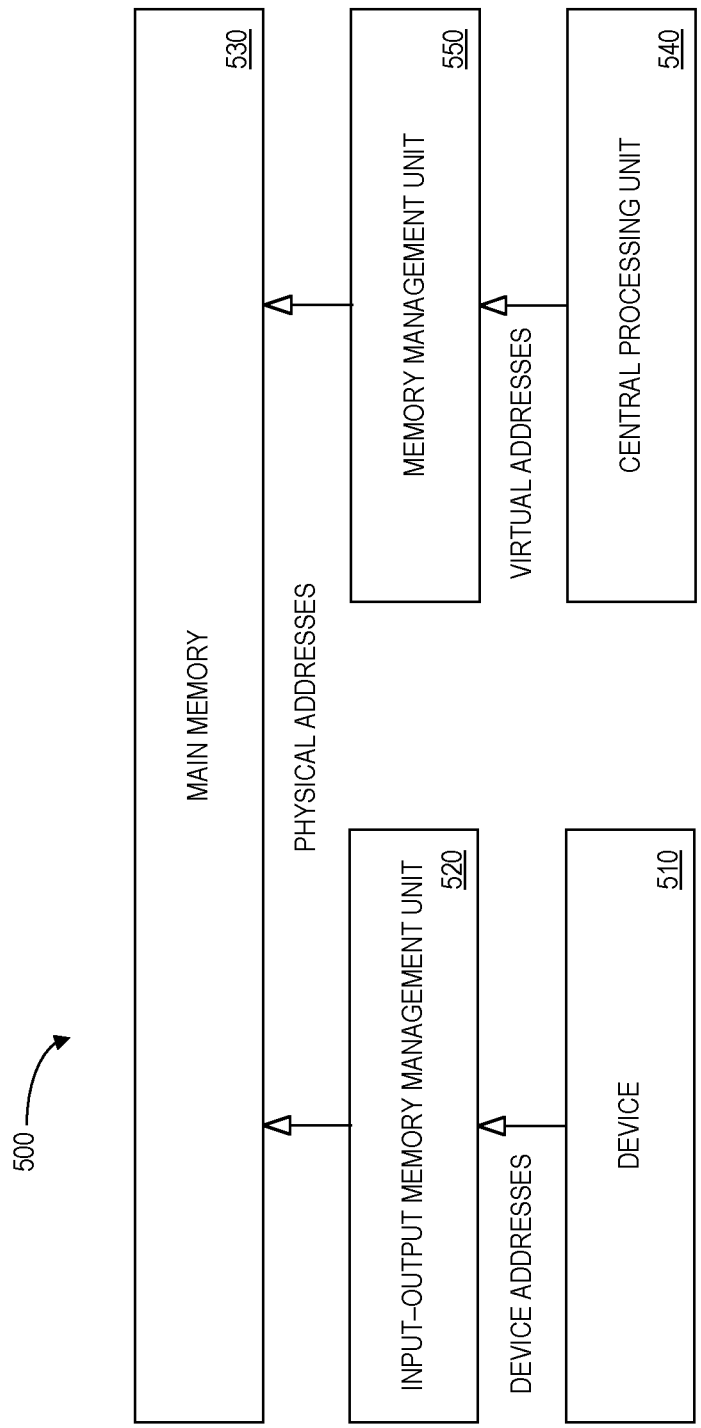
FIG. 5 illustrates a system with an input output memory management unit according to some embodiments.

FIG. 5 illustrates a system 500 with an Input-Output Memory Management Unit (IOMMU) 520 according to some embodiments. In particular, the IOMMU 520 receives device addresses from a device 510 and provides physical addresses to a main memory 530. Similarly, a MMU 550 receives virtual addresses from a CPU 540 and provides physical addresses to a main memory 530. A third root-of-trust may, according to some embodiments, be based on "trust features" of the processor itself. In this case, ICS component architecture might be adapted to accommodate such features. For example, some Intel, AMD, and Freescale processors provide for a trusted boot that is used to lock down the processor and place it in to a "known good" security state that ensures the integrity of the run-time environment. Such trusted boot mechanisms might disable hardware debug ports and external IO to prevent Direct Memory Access ("DMA")-based code injection attacks, etc.

Figure 6:
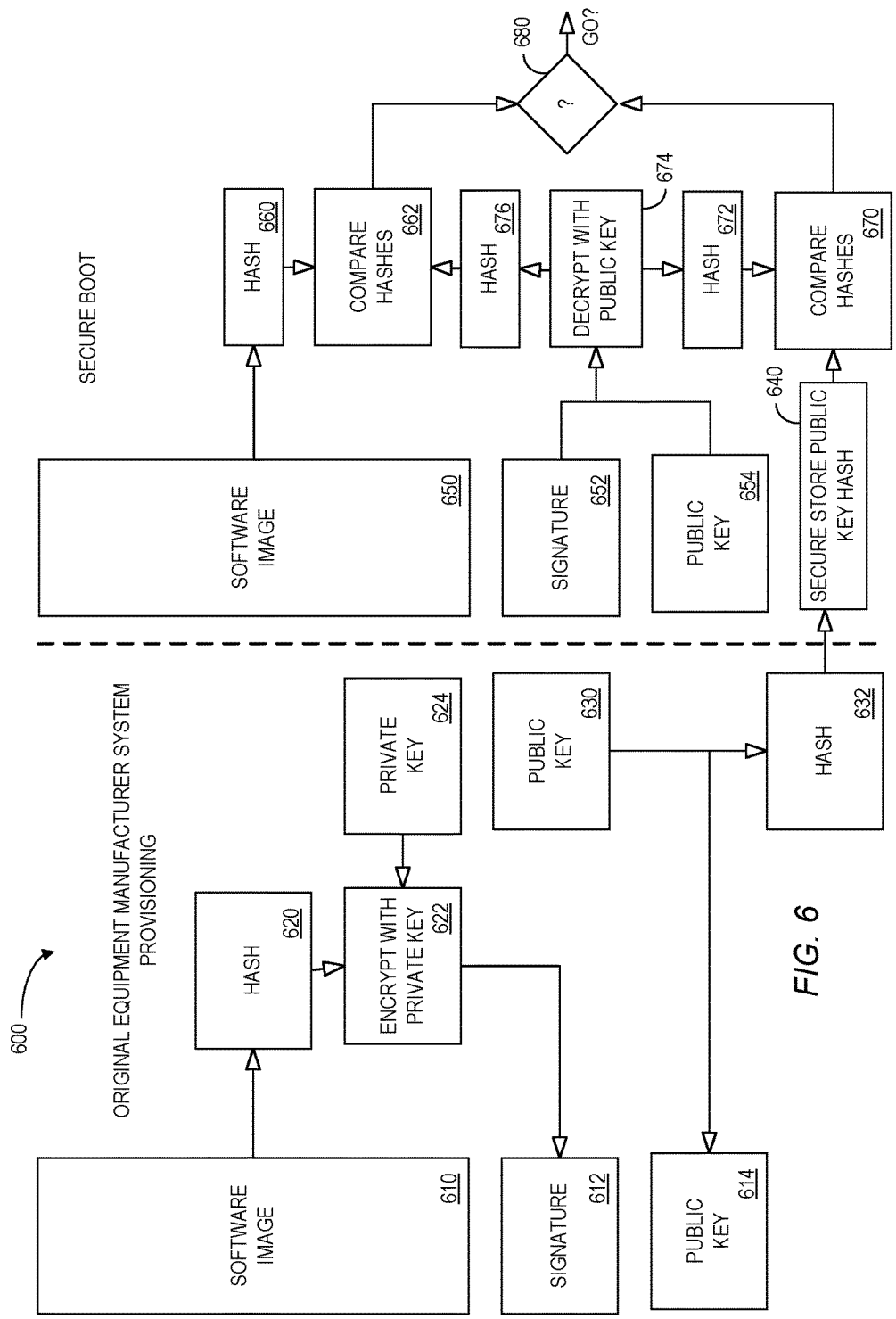
FIG. 6 represents original equipment manufacturer system provisioning and a secure boot in accordance with some embodiments.

FIG. 6 represents a system 600 with original equipment manufacturer system provisioning and a secure boot in accordance with some embodiments. The system includes a software image 610, signature 612, and a public key 614. The software image 610 is used to generate a hash 620 that is encrypted 622 with a private key 624 to create the signature 612 from a public key 630, 614 creates a hash 632 that is securely stored 640. A software image 650 on the secure boot side is provided along with a signature 652 and public key 654. The software image 650 is hashed 660 and compared 662 with a hash 676 decrypted with the public key 674. If the hashes match at 680, the boot is secure. Note that a verified boot may rely on the current boot stage to cryptographically verify (e.g., through cryptographic hashes and digital signature verification) the integrity of the next stage components prior to transferring control to the next stage. If the verification process does not check out, this might indicate tampering with the system and progress from the current boot stage to the next boot stage may be blocked.

Note that a verified boot cannot typically differentiate between two different versions of the system software and firmware if the same signing keys are used. Hence additional mechanisms (e.g., monotonic counters) could, according to some embodiments, be employed to detect rollback attempts to older software and firmware images. In some embodiments, measured boot technologies may be used to monitor and audit the integrity of the software and firmware components used in the ICS controllers boot stack.

Measured boot may represent a more passive approach in that a boot sequence collects measurements about the various software and firmware components (e.g., BIOS, firmware, hypervisor, OS kernels, read-only file systems, etc.) being used in the system. These measurements can be used to verify that a valid set of software and firmware has been used to bring up the system.

Access to platform secrets (e.g., private keys and symmetric keys) can be tied to these platform integrity measurements. For example, the system may encrypt the read-write file systems and/or partitions where applications are hosted to prevent IP theft and offline tampering, and these measurements might be stored in connection with the TPM. The symmetric key(s) used to encrypt such information may be sealed and protected by the integrity measurements of the platform. The system can only access this information if a valid set of platform integrity measurements was collected during boot.

Furthermore, the set of measurements might be used to verify the integrity of the platform to its peers on the network. Typically, there is a centralized "attestation" server that will request a "quote" from the system and evaluate the set of measurements returned in the quote by comparing these measurements with known good values. If these measurements check out, then the system will be deemed trusted (i.e., have known good integrity) and be allowed to join the ICS network for its assigned function. If the measurements do not check out, then the system is flagged as suspicious and would typically be blocked from joining the network in its normal mode until the security issues have been reviewed and resolved.

A trusted boot is more specialized, and may be associated with a specific processor architecture (and associated security features). For example, with Intel and AMD systems, the processors will reinitialize in to a secure state that disables IO peripherals and hardware debug ports. The trusted OS or hypervisor is then responsible for configuring the processor IOMMU hardware by allocating system memory regions to facilitate DMA transfers with the peripherals. In this example, the external IO devices might only be permitted to perform DMA transfers to/from these designated memory regions. Any access to memory outside of the designated memory regions for the device is a security exception that is blocked (and a hardware security exception may be generated).

One concept associated with trusted boot is that the system may allow a processor's hypervisor and OS sufficient time to configure the low level platform hardware to a known good trusted configuration state. Once the platforms are configured, the platform will be more resistant to malicious peripheral attacks against the system (e.g., code injection and memory scraping attacks) and attacks from one Virtual Machine ("VM") to another. Secure boot technologies may extend trust from a hardware or firmware root-of-trust into the run-time platform for the ICS component. Note that these secure boot technologies may be used in isolation or in various combinations to facilitate run-time platform integrity.

According to some embodiments, a processor is placed into a trusted state. After being placed into the trusted state, the system may load and decrypt the software and firmware stack during boot based on having the correct set of platform measurements collected during the measured boot of the platform. Storing proprietary software and IP as encrypted objects in the file system, and only allowing these objects to be loaded and decrypted during a trusted system boot, may provide IP protection as well as minimizing the potential attack surface on real-time OSs, virtual machines, etc. Such an approach may have the advantage of securing the proprietary platform information independently from any mechanisms embedded in the Real-Time OS ("RTOS") instances themselves.

Figure 7:
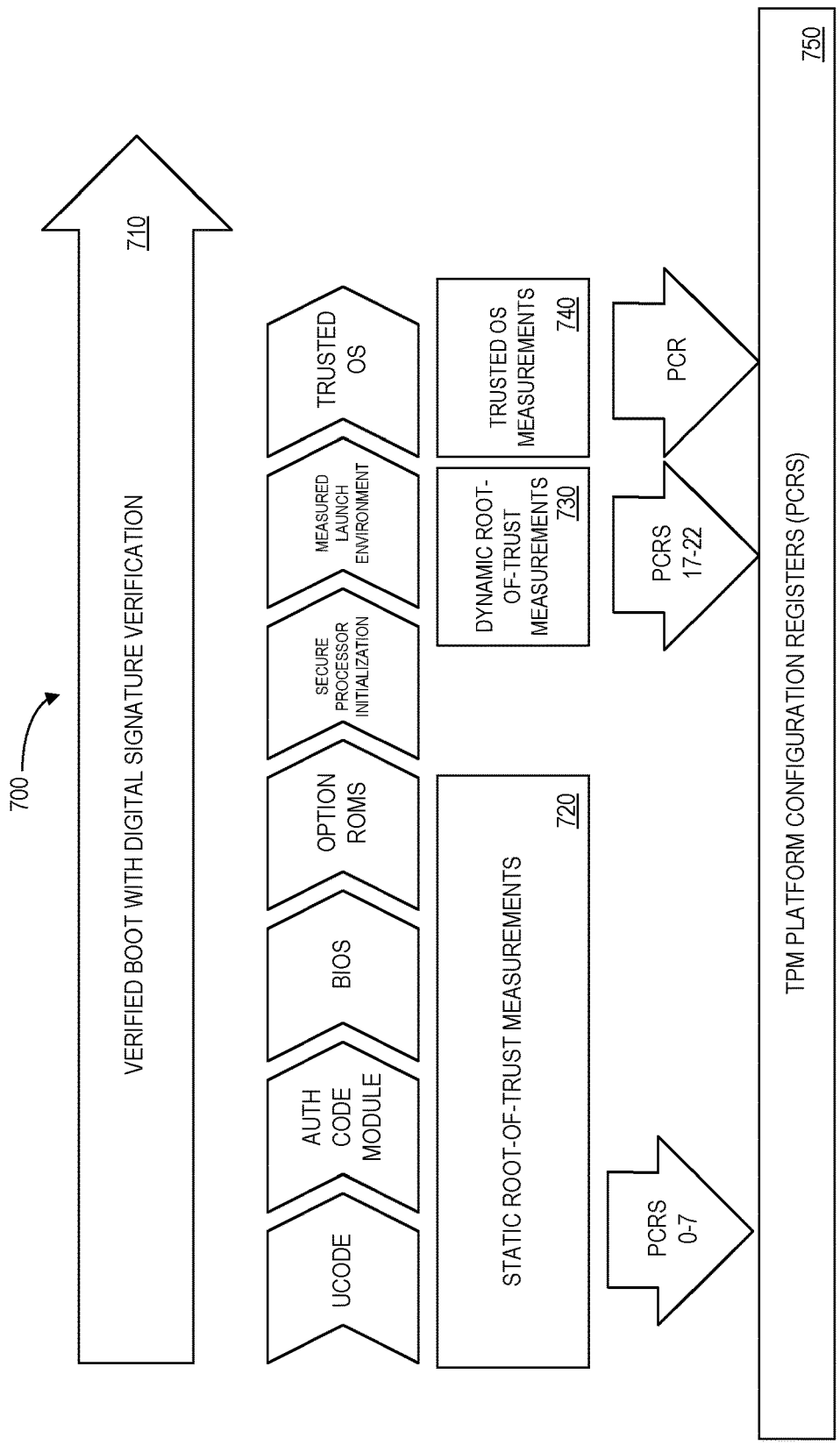
FIG. 7 illustrates a measured boot process and its relationship with a secure boot according to some embodiments.

FIG. 7 illustrates 700 a measured boot process and its relationship with a secure boot according to some embodiments. In particular, a verified boot 710 with digital signature verification may be performed. Note that such a process might be associated with static root of trust measurements 720 (e.g., associated with U-code, an authentication code module, BIOS, and/or options ROMs) that is stored into PCRs 0 through 7 of the TPM 750. Similarly, the verified boot 710 might be associated with dynamic root-of-trust measurements 730 (e.g., that are associated with a measured launch environment) that are stored into PCR 17 through 22 of the TPM 750 in accordance with a TPM standard. In addition, the verified boot 710 might be associated with trusted OS measurements 740 that can be stored in one or more PCRs (depending on configuration) of the TPM 750. The trusted OS and hypervisors may be responsible for configuring their respective run-time environments and for extending this trust to applications and services that are executed on the platform. The trusted OS (and hypervisors in the case of separate VMs) must configure the hardware IOMMUs (if present) to match the available devices and associated device driver requirements. For example, a device driver will need to allocate memory regions that are to be used by the attached peripherals for DMA transfers under control of the peripheral. The trusted OS should configure all of the IOMMU regions on the system prior to enabling any IO communications with peripherals.

Likewise, the trusted hypervisor (if present) may allocate physical devices to specific operating system images as well as identify and designate shared memory regions to be used among virtual machine instances. For example, such shared memory regions would be used for virtual devices that interact with other virtual machine instances on the platform. The hypervisor should be responsible for configuring the underlying hardware (e.g., MMU, IOMMU, VT-d, VT-x, etc.) associated with hosting the virtual machines and facilitating interactions with the virtual machines and physical devices on the ICS platform.

In addition to initializing and managing the IOMMU and MMU hardware, the trusted OS may be responsible for measuring and/or verifying the integrity of objects being used by the OS (e.g., executables, configuration files, etc.). The Linux Integrity Measurement Architecture ("IMA") is an example of such a security mechanism. Linux IMA will evaluate the integrity of objects when accessed by the operating system kernel based on security policies. These security policy driven access control mechanisms are used to prevent the installation and execution of malicious software, root kits, etc. on the ICS platform during run-time. A RTOS partner ecosystem may extend the run-time integrity measurement mechanisms into a respective RTOS.

On top of the Linux IMA infrastructure, Linux provides a variety of Mandatory Access Control ("MAC") mechanisms that are used to prescribe and control the behavior of applications and services at run-time based on security policies. Examples of alternative Linux MAC implementations include SELinux, SMACK and AppArmor. The MAC security policies define how a system agent (e.g., process) can interact with other processes and system resources (e.g., file system objects, IO devices, etc.). A party associated with a RTOS may also develop and implement MAC technologies for the RTOS. In addition, embodiments may use lightweight container (e.g., Docker and LXD) mechanisms to isolate, manage and enhance the portability of applications and services that run on top of the underlying OS. These container technologies may simplify and enhance development, portability, maintainability and security of applications on the OS.

Note that other security technologies may be used to enhance the security disposition of an ICS platform. Examples may include technologies such as Address Space Layout Randomization ("ASLR"), which places software objects at random memory locations thus making them more difficult for malware to locate and exploit, stack canaries (which detect stack overflow attacks, etc.) and so forth. Such an approach might also provide control flow integrity, prevent undesirable execution, etc.

Figure 8:
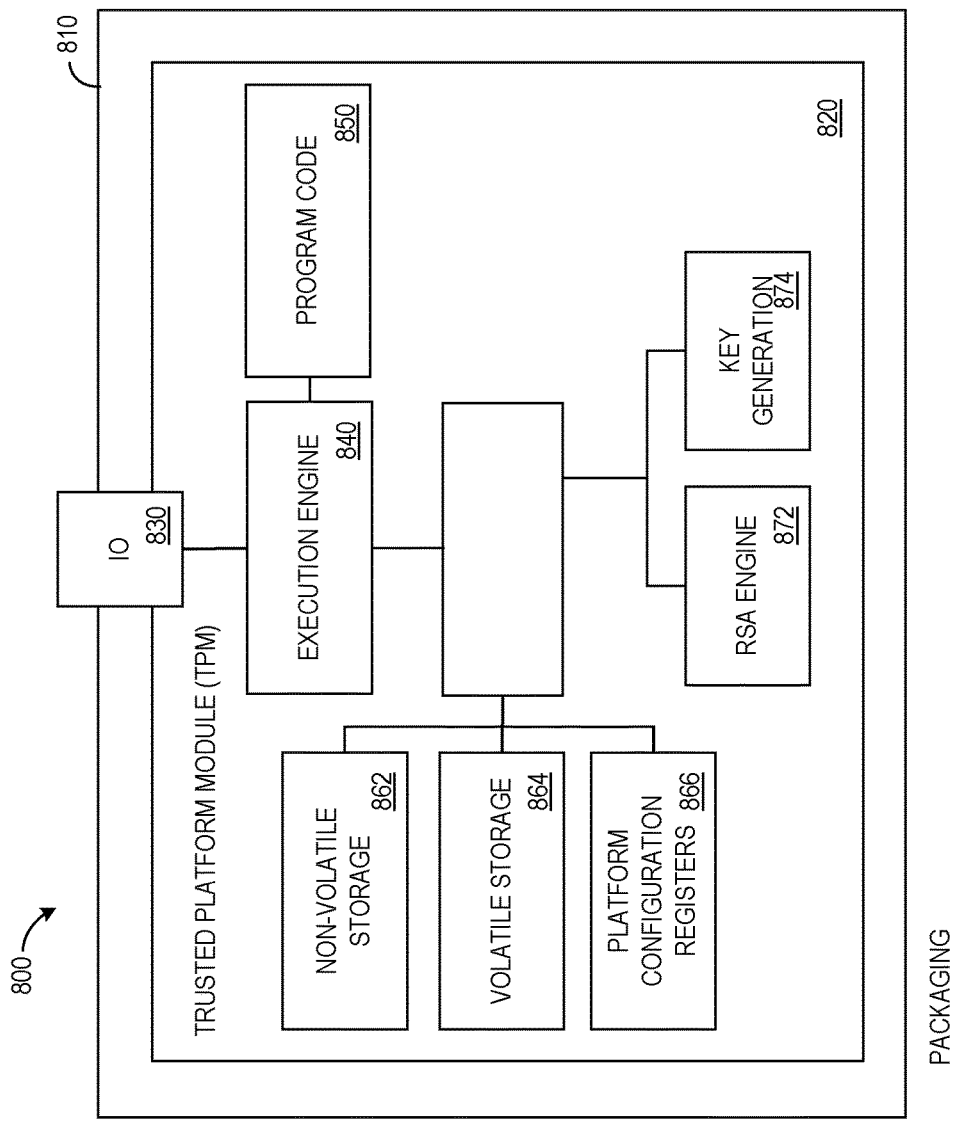
FIG. 8 represents trusted platform module packaging in accordance with some embodiments.

FIG. 8 is an example 800 of TPM 820 packaging 810 in accordance with some embodiments. The TPM 820 might communicate via an IO element 830 coupled to an execution engine 840 that runs program code 850. The TPM 820 may further have an RSA engine 872, key generation 874, non-volatile storage 862, volatile storage 864, and PCRs 866. According to some embodiments, information confidentiality requires the ability to securely protect that information and only make it available to authorized applications, users, etc. based on applicable security policies. Encryption may be used (e.g., BitLocker) to protect sensitive information and it is common practice to encrypt hard drivers, SSDs and other persistent data stores that contain sensitive information. Typically, a password is required to allow a system to decrypt and boot using an encrypted drive. In an embedded system, the ICS controller might be able to boot autonomously (without requiring human intervention to enter a password). Further, the system may protect the contents of the drive through message authentication code, such as a keyed Hash Message Authentication Code ("HMAC") (e.g., dm-verity). According to some embodiments, a TPM device may secure and protect the symmetric keys used for the file system/partition encryption or for message-authentication codes, and thus eliminate the need for someone to manually enter the appropriate password information to decrypt the storage media. Furthermore, embodiments may use the platform integrity measurements collected during the measured boot process to seal and protect the symmetric encryption key(s). Thus, the encrypted information is only accessible if the correct platform integrity measurements were recorded during the measured boot phase on the platform.

In order to ensure confidentiality and integrity of communications, encrypted communication protocols may be used according to some embodiments, Such secure communication protocols generally use symmetric encryption algorithms (e.g., AES) for high-speed data encryption and decryption. Such symmetric encryption algorithms offer the advantage of high data throughout speeds, but require that all parties have access to the same encryption keys for encrypting and decrypting communication information. To facilitate symmetric key distribution, public key-private key based algorithms (e.g., RSA, Elliptic Curve or EC) and protocols (e.g., Elliptic Curve Diffie-Hellman ("ECDH"), ECDSA, etc.) may be used in accordance with some embodiments. The overall security of these security algorithms and protocols may depend on an ability to secure the private key information on the device. If these private keys are compromised, then the overall security of the ICS system can be subverted.

The private keys might be stored in a password protected secure key store on the embedded device. Such key stores are typically in the file system and may be compromised by simply reverse engineering the device's storage media and extracting the key store and associated passwords. Furthermore, the private keys—once retrieved from the key store—are then used unencrypted in system memory. Such keys are then vulnerable to a variety of security attacks (e.g., memory scraping, cold boot) and security vulnerabilities (e.g., Heartbleed for OpenSSL). To mitigate these attacks, security standards such as IEC 62443-4-2 require that such sensitive private key information be protected by a Hardware Security Module ("HSM"). In practice, a TPM device is a low cost hardened anti-tamper HSM device. Public key/private key pairs generated in the HSM device will encrypt the private keys for key management outside of the HSM device thus rendering these private keys useless unless loaded in to the HSM. Some embodiments may use a TPM device to encrypt and protect the private key information used to secure communication protocols, thus mitigating a large class of security attacks against a system.

Figure 9:
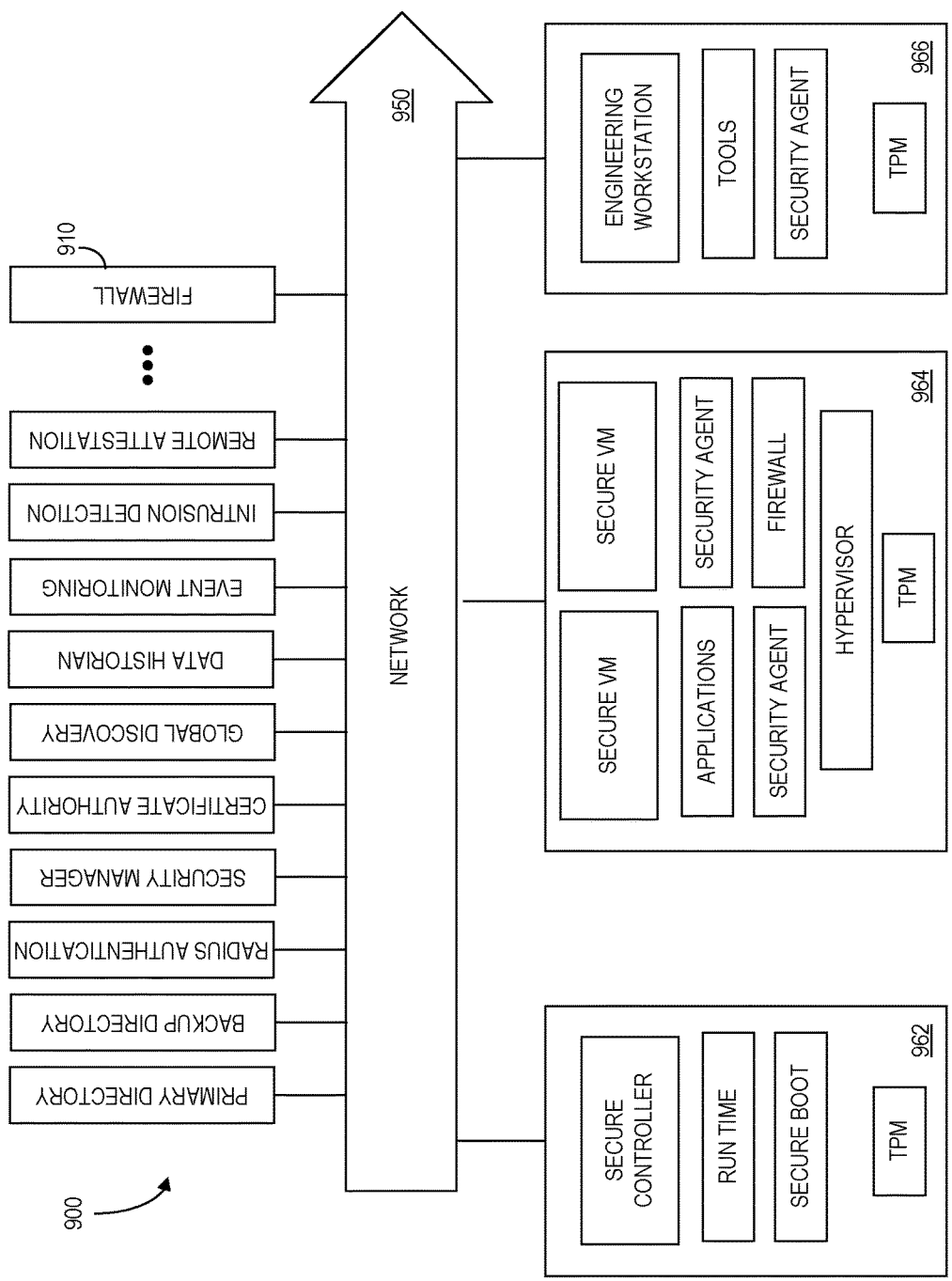
FIG. 9 illustrates network security services according to some embodiments.

FIG. 9 illustrates network security services 900 according to some embodiments. A number of elements 910 may be associated with a network 950 including a primary directory, a backup directory, a RADIUS authentication, a security manager, a certificate authority, a global discovery, data historian, event monitoring, intrusion detection, remote attestation, firewall, etc. A device 962 coupled to the network might include a TPM, a secure boot, a run-time, and secure controller (e.g., associated with Windows, VxWorks, QNX, Linux, etc.). Similarly, a device 964 might include a hypervisor associated with multiple secure virtual machines and a device 966 includes an engineering workstation and tools. In order for a device to function in a distributed ICS, various networking security services may support the deployment of a hardened ICS controller in the overall ICS. These services typically include Public Key Infrastructure ("PKI") services, directory services, network and device authentication services, attestation services, Security Incident and Event Monitoring ("SI & EM") services, etc.

The PKI services may be used to issue and manage X.509 certificates for code signing of software and firmware on devices. This code signing may support the verified boot sequences and the run-time integrity checking in the OS and application stack. The private keys associated with the product code signing certificates must be associated with and bound to HSMs to help ensure that the signing keys are not compromised. These signing keys might be built in to the overall software and firmware build processes. Product and development releases may, according to some embodiments, be differentiated using different signing keys.

In addition, the PKI services may be used to issue and manage X.509 device identity certificates for ICS components. The device identity certificates may authenticate the ICS component as well as exchange symmetric keys for encrypted communications used in secure network communications. The ICS components might communicate with the PKI's certificate and registration authority services in order to generate an X.509 certificate request. There are a variety of X.509 certificate request protocols available, such as the Simple Certificate Enrollment Protocol ("SCEP"), Enrollment over Secure Transport ("EST"), and global discovery service (e.g., associated with Open Platform Communications-Unified Architecture ("OPC-UA")). For applications with higher assurance levels, the public key-private key pair being used for the X.509 certificate may be tied to the ICS platform's HSM device (e.g., TPM).

The directory services (typically based on LDAP protocols) may be used to manage devices, users, roles and responsibilities, etc. in the overall ICS system. For example, operators and administrators may have different privileges on the ICS components (e.g., change operational set points in the ICS versus applying software or firmware updates). The directory services provide centralized management and administration of users and devices as well as respective roles and responsibilities in the ICS.

When an ICS device initially boots on to the ICS network, the system may determine what that device is and whether it can be trusted on the network. In some embodiments, the ICS may simply trust any device that is able to boot on the ICS network. In more secure environments, the device may be required to authenticate on the network prior to be assigned to its place in the ICS network. There are a number of different network authentication protocols that exist and are supported by the networking switching equipment (e.g., Cisco switches). For example, IEEE 802.1x with EAP-TTLS may be used to authenticate an ICS component attempting to join the ICS network.

As part of the network authentication of the ICS device joining the network, the device may be asked to prove its integrity through a process called "remote attestation." In this process, the device joining the network is challenged by the attestation server to return a "quote" from the device used as the root-of-trust for measurement (i.e., the TPM device). The TPM device will digitally sign the set of platform measurements along with a "nonce" (number used once) provided by the attestation server's quote request to prevent replay attacks. The quote generated by the ICS component is returned to the attestation server and—if the platform measurements check out—then the ICS device is allowed to join the ICS network. If the platform measurements in the quote do not match the expected values, then a security exception is generated and the incident is flagged to the attention of the ICS security team.

An SI & EM service may monitor ICS log files generated across the set of ICS components and devices used in the overall ICS deployment. The SI & EM (e.g., Splunk, Nitro, etc.) may allow security personnel to monitor, correlate and—hopefully—detect and respond to security incidents in a timely manner so that any incidents can be rapidly isolated and contained. Additional security services that may be deployed in the ICS system include intrusion detection and preventions systems (e.g., Wurldtech's OpShield devices), Global Discovery Services ("GDS"), secure update services for local caching and distribution of software and firmware updates, remote gateway services (e.g., Predix Field Agent), Key Distribution Servers for GDOI based communications, etc.

To facilitate security in an ICS component, it may be helpful to rapidly identify and update security vulnerabilities in the ICS platform software stack. Due to the large number of software packages available, security issues are identified on a daily basis with updates pushed to fix these vulnerabilities. Continuous monitoring may be performed for vulnerabilities and updates in the ICS component software and firmware stacks. As vulnerabilities are disclosed and patched, updated software may be pulled, compiled and built, digitally signed and the update software may be packaged using code signing certificates and following appropriate business policies and release processes. The updated software may be subjected to extensive regression testing to verify that the software fixes do not negatively impact system functionality. Assuming that the software updates are deemed stable and that security vulnerabilities warrant field deployment, then the newly packaged and signed software will be prepared for distribution and deployment on the fielded ICS devices and components.

The secure software update mechanisms for packaging and distributing these updates may leverage standard packaging technologies used in various OS (e.g., Linux) distributions. For example, the Debian and Ubuntu Linux distributions use the DEB packaging system. Similarly, Fedora and Red Hat distributions use RPM packages. Furthermore, the software components may be packaged as containers (e.g., Docker containers) and distributed through third-party configuration and management infrastructure (e.g., Resin.IO). In addition, Windows based platforms and systems have their own software packaging and update mechanism. The secure update mechanisms must scale across operating systems and platforms. In order to deploy the software updates on the target ICS platforms, the package code signing tools may include the signature information and integrate with the run-time signature verification mechanisms with appropriate public keys that correspond to the private signing keys. For example, code signing of the Linux packages would need to adhere to the Linux IMA mechanisms. According to some embodiments, the deployment of package updates may be transactional such that an update either succeeds completely or—if it fails—rolls back to the original state prior to attempting to apply the update.

Security policies may impact the behavior of an ICS deployment in a number of ways and the set of security policies used are distributed throughout the platform boot and run-time operations. For example, security policies may define how to respond to changes in the underlying platform during secure and measured boot processes. Furthermore, they may define what platform secrets may be made available or denied access based on platform integrity measurements collected during the platform boot and trusted run-time phases. In the OS run time, the security policies in the Linux IMA may define how the OS measures signed objects in terms of what to verify, user identities that should be verified, the consequences associated with verification failures and the secure logging requirements around such security operations. Likewise, the security policies associated with the mandatory access controls define how processes can interact with other system processes and resources—and even which networks and devices any given process or device can interact with. The security policies may also cover the level of authenticated access (e.g., unauthenticated, X.509 certificates, two factor authentication), the role based access control (RBAC) policies controlling which devices and users can do what on the ICS system, etc.

The collection of security policies may have practical implications associated with the ICS architecture. For example, related information that shares the same security policies may be treated as a uniform security domain. Should information need to be shared between two or more security domains with different security policies, then the communication points between security domains must be explicitly defined and the information flows must be appropriately filtered based on security policies that apply to information exchanges between different security zones. All interactions between different security domains may flow through "cross domain solutions" (such as "write-down guards," etc.) that implement the relevant domain security policies about information disclosure, etc. Such an approach might also address permissions of users, devices, and/or roles to interact with the data (e.g., permissions to read, write, append, delete, etc.).

According to some embodiments, applications live on top of the "trusted ICS platform" described herein. The trusted ICS platform may include a number of security technologies and features such as secure boot, trusted operating systems, network security services, security policies, ICS architectures, etc. The applications are expected to be well behaved with respect to this trusted platform's security stack. Any violations of the security stack polices, etc. should be identified and reported—and potentially blocked (based on security policies). Moreover, the applications themselves may be hardened against various attack vectors. The trusted ICS platform may help ensure the confidentiality and integrity of information, applications, software and firmware in the underlying security stack that the applications depend on. However, the applications themselves must be hardened against various attack vectors that cannot be covered by the underlying trusted ICS platform. These include implementation of network and device communications, adoption of secure communication protocols, etc. In addition, penetration testing and third party certifications of the platforms and applications (e.g., Wurldtech Achilles certification) might be utilized.

According to some embodiments, independent third party teams may be leveraged to assess the security of the trusted ICS platforms, architectures and applications. The trusted platform components will be taken through independent security assessments and vulnerabilities identified in these assessments should be mitigated and fixed. The security certification artifacts of the underlying trusted ICS platform can be leveraged for applications developed and deployed on top of these trusted platforms.

Figure 10:
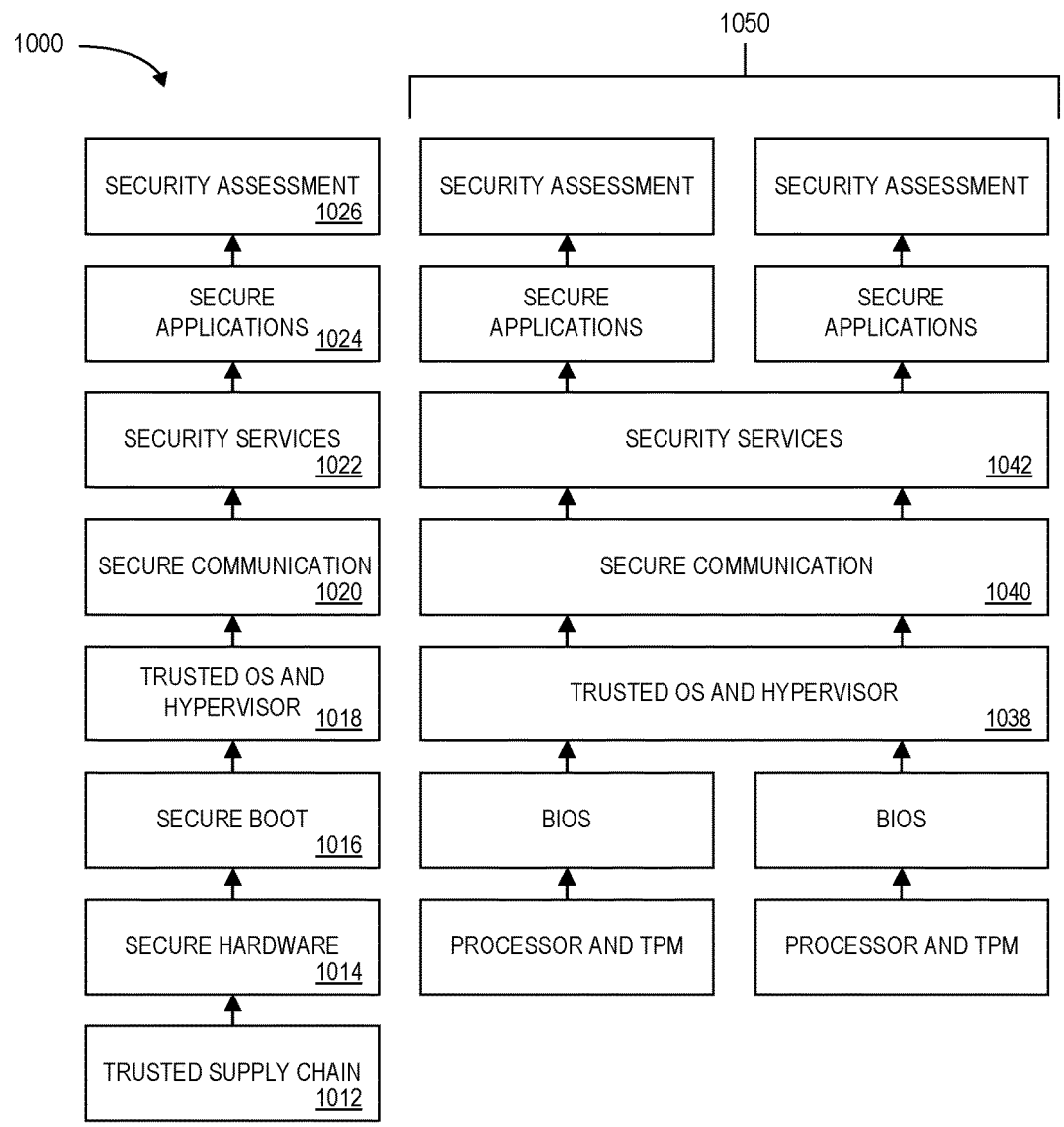
FIG. 10 illustrates a scalable chain-of-trust implementation for industrial control systems in accordance with some embodiments.

The ability to assess and certify reusable trusted platform components offers tremendous advantages for reducing the Non-Recurring Engineering ("NRE") costs of other ICS deployments based on the same trusted platform stacks. According to some embodiments, an industrial control system is associated with a first type of industrial control system. Moreover, a hardware security module might be selected as dedicated security hardware for another industrial control system (associated with a second type of industrial control system), and a common security framework may be applied to a number of different processors and hardware security module configurations (e.g., leveraging operating systems, etc.). For example, FIG. 10 illustrates a scalable chain-of-trust 1000 implementation for industrial control systems in accordance with some embodiments. The chain-of-trust 1000 includes a trusted supply chain 1012, secure hardware 1014, secure boot 1016, trusted OS and hypervisor 1018, secure communication 1020, security services 1022, secure applications 1024, and security assessment 1026. In addition to a single chain of trust for a specific processor and a specific controller product, embodiments may provide a scalable security architecture that allows one to integrate disparate controllers with a wide variety of processor architectures 1050 and implementations into a common overall security architecture framework (e.g., a common trusted OS and hypervisor 1038, a common secure communication 1040, common security services 1042, etc.).

By standardizing a common set of security features for the OS, communications and security services, embodiments may realize substantial scalability of the security infrastructure used in embedded products. Incrementally adding new processor architectures to the supported portfolio requires inclusion of dedicated security hardware (e.g., a TPM device) and adapting the platform boot software to implement secure boot technologies such as verified boot, measured boot and trusted boot. Once a new controller and processor family are integrated in to the overall security architecture, the system can then leverage the higher level security services provided by the OS, communications and security services.

Note that a processor may start-up using boot loaders to load unencrypted, hypervisors, OSs and initialization file systems. This may expose the hypervisor configurations, OSs and initialization file systems to reverse engineering any off-line attacks. Modern storage media such as Solid State Drive ("SSD") devices now typically support full encryption of the storage media which can be used to prevent an adversary from removing the storage device from a system and installing and accessing the information from their own computing systems with the intent of compromising the system. However, there are several issues with the encrypted storage media. For example, the user must typically be prompted for a password in order to unlock the encryption key associated with that media. This works well for laptops and desktops where there is actually a user of the system to enter the password, but this approach may not be applicable for systems that boot unattended. That is, without a person to enter the password information (e.g., embedded devices, controllers, and servers).

A system BIOS may be modified to store a password or passphrase used to unlock the encrypted storage in a secure store such as a TPM. This storage media password can be "sealed" to the platform's static root-of-trust measurements as collected by the system's BIOS and stored in the TPM device's PCRs (e.g., using PCRs 0 to 7). Thus, the system may tie the availability to decrypt and access information on the encrypted storage media to the integrity measurements of the platform's static root-of-trust. This includes the device's BIOS and firmware, BIOS settings, connected devices, etc. If there has been any tampering with the BIOS, BIOS settings, connected devices, etc., then access to the storage media password is rejected by the TPM because the PCR values do not match the expected PCR measurements.

Further note that encrypted storage media allows booting the platform to the boot loader stage (e.g., GRUB) prior to loading the operating system, hypervisor, initialization file systems, etc. From the boot loader, it is typically possible to change boot parameters on the target OS, manipulate which objects get loaded for the system boot, etc. Since all information on the storage media is now unencrypted and available to attackers on the system, this represents a second attack vector for reverse engineering the system as well as for the introduction of malware in to the system.

According to some embodiments, a measured boot—based on Intel TXT and AMD SVM technologies and implemented in Tboot from Intel and adapted to AMD processors—collects dynamic root-of-trust measurements for the platform and place these measurements into additional TPM PCRs (e.g., PCRs 17 to 22). These measurements are then used to ensure the integrity of various boot objects such as the hypervisor, OS and any initialization file systems used on the platform when it boots. Thus, the system can detect tampering with these file system objects, but cannot prevent reverse engineering of the objects.

In analyzing the security of computing systems, there may be a vulnerability during boot as a result of malicious peripherals attached to the system. For example, malicious devices such as hard drives or other DMA capable devices have been used for code injection attacks to inject malware (e.g., key loggers, etc.) into the OS. To thwart such attacks, Intel and AMD introduced memory management units that restrict the DMA of attached IO peripheral devices. Intel refers to this capability as VT-d and AMD refers to it as IOMMU. The Intel TXT/AMD SVM technologies leverage the VT-d and IOMMU technologies, respectively, in the associated Tboot code in order to place the processor in to a trusted security state. This trusted state disables external IO, debug ports, etc.

However, the TXT and SVM technologies do not thwart the reverse engineering of the boot objects as these objects are loaded clear text into memory prior to entering the trusted state and may thus be extracted from the system for reverse engineering and other malicious purposes. According to some embodiments, the Intel TXT or AMD SVM processors capabilities are utilized. However, instead of loading unencrypted boot objects, the system loads encrypted boot objects during boot. These objects may be, for example, cryptographically opaque to an attacker. The processor may then be re-initialized into a trusted state where the external IO DMA transfers are disabled, as are hardware debug ports. The processor is now in a known good hardware environment with encrypted boot objects loaded in memory.

The secure boot loader—which is part of the Tboot process and is unencrypted—may be used to measure these encrypted objects and place those measurements into the TPM PCRs. These measurements are then used to access the platform encryption key "sealed" to these platform PCRs. This platform encryption key is then used to decrypt the boot objects in memory in the trusted platform state. Thus, the boot process flow can resume on the processor now that it is locked down in the trusted state. The advantage of such an embodiment is that the attack surface for accessing and reverse engineering sensitive IP assets on the system is substantially reduced as the only place the information exists in an unencrypted form is in the processor memory. With hardware debug ports disabled and IO peripheral DMA access locked down, an adversary would be forced to use cold memory attacks (e.g., difficult if memory is soldered down to board) or subversion of the Tboot decryption key mechanism (which is measured and used to seal and protect the decryption key).

Figure 11:
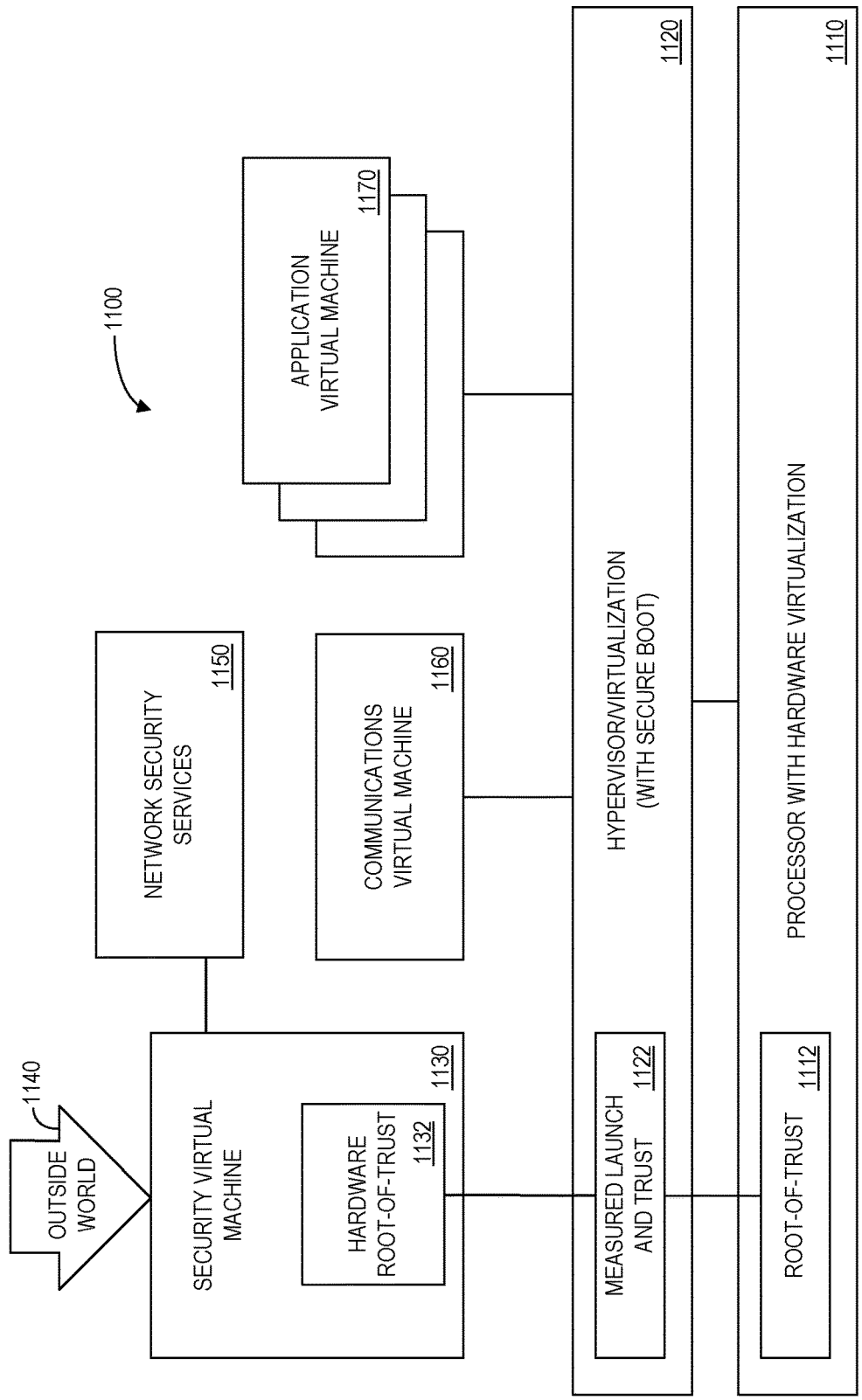
FIG. 11 illustrates an integrated intrusion detection system for an industrial control platform in accordance with some embodiments.

With the growth in capability of processors used in embedded applications, systems are adopting hypervisors and related virtualization technologies allowing for the combination of multiple elements of a distributed embedded system into a single physical device. Previously, each of these functional elements may have been implemented as discrete components in an overall system. As embedded applications and services are moved into a virtualized environment, the networking is also moved into that environment as well. FIG. 11 illustrates an integrated intrusion detection system for an industrial control platform 1100 in accordance with some embodiments. The platform 1100 includes a processor 1110 having a root-of-trust 1112. A hypervisor 1120 has a measured launch and trust 1122 that interacts with a hardware root-of-trust 1132 of a security virtual machine 1130 that receives communications 1140 from the outside world. The hypervisor 1120 further supports a communications virtual machine 1160 (e.g., filtering, monitoring, and a virtualized root-of-trust) and a set of application virtual machines 1170. According to some embodiments, the security virtual machine 1130 further interacts with network security services 1150 (e.g., monitoring and management services, directory services, analytic services, etc.).

In a relatively simple example, a single embedded real-time controller may be provided with a non-real-time application gateway that performs remote communication and management services for the controller. From a security perspective, the system may also include an intrusion detection capability as well as a firewall to monitor and control network traffic between virtual machine components and identify/respond to anomalies. Traditionally, these would be three separate hardware components (i.e., controller, application gateway and intrusion detection). In a virtualized environment, these three components could be implemented as virtual machines and consolidated into a single controller using a real-time hypervisor environment. By bringing the virtualized hardware components into the hypervisor environment, the associated networking is also brought into the virtualized environment. From a security perspective, an intrusion detection system is able to monitor all internal network traffic as well as network traffic entering and leaving the physical system. The firewall is configured to allow traffic on specific network ports and is implementing the zone segregation policies on the system.

Similarly, for a more complex example, a distributed control system may include one or more real-time controllers, one or more Human Machine Interface ("HMI") systems along with various network-based security services such as network intrusion detection, directory and Remote Authentication Dial-In User Service ("RADIUS") services, Virtual Private Network ("VPN") services and system logging services. Such ICS networks may be segregated into multiple network security zones. By virtualizing these control system components and associated network security zones, the system can implement controls with substantially enhanced network isolation and security characteristics. The system may then instrument and monitor all of the distributed control system traffic with the network intrusion detection systems. In addition to the network security services described here, these services may be implemented on top of the trusted boot foundation and associated security services in accordance with any of the embodiments described herein.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information described herein may be combined or stored in external systems). Moreover, although embodiments have been described with respect to industrial control systems, note that embodiments might be associated with other types of computing systems, including non-industrial control systems and processors in general. The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A method for an overall chain-of-trust for an industrial control system, comprising:
providing secure hardware, including a hardware security module coupled to or integrated with a processor of the industrial control system to provide a hardware root-of-trust;
providing secure firmware associated with a secure boot mechanism such that the processor executes a trusted operating system, wherein the secure boot mechanism includes one or more of a measured boot, a trusted boot, and a protected boot;
accessing objects via secure data storage;
exchanging data via secure communications in accordance with information stored in the hardware security model;
selecting the hardware security module from a trusted supply chain component entity;
wherein the industrial control system is a distributed industrial control system and the hardware security module is associated with an industrial control system controller that utilizes public key infrastructure services to issue and manage certificates for code signing of software and firmware on components of the industrial control system, and the method further comprising:
deploying security updates for the industrial control system using package code signing tools that include signature information integrated with run-time signature verification mechanisms with appropriate public keys and correspond to private signing keys; and
implementing security policies to facilitate confidentiality, integrity, and availability of the industrial control system;
wherein a security architecture treats related information that shares a security policy as a uniform security domain; and
wherein applications executed by the industrial control system are hardened against a plurality of attack vectors via implementation of network and device communications, adaptation of secure communication protocols, penetration testing, and third-party certification of the industrial control system in connection with the applications being executed.

2. The method of claim 1, wherein the hardware security module comprises a trusted platform module.

3. The method of claim 1, wherein the secure boot includes an input output memory management unit and a capability to disable non-essential input output paths, including debug ports.

4. The method of claim 1, wherein the secure data storage is associated with at least one of: (i) an encrypted store, and (ii) private cryptographic keys stored in the hardware security module.

5. The method of claim 1, wherein private key cryptographic operations are performed in the hardware security module to facilitate device identification in secure communications.

6. The method of claim 1, further comprising:
verifying a correct set of platform integrity measurements collected during a measured boot of the processor.

7. The method of claim 1, further comprising:
placing the processor in a trusted state; and
after the processor is in the trusted state, loading, decompressing, and decrypting the objects in processor memory to create the firmware and software stack.

8. The method of claim 7, further comprising:
executing, by the processor, a hypervisor to create and run virtual machines for the industrial control system.

9. The method of claim 1, wherein the industrial control system is associated with a first type of industrial control system and further comprising:
selecting the hardware security module for another industrial control system associated with a second type of industrial control system, wherein a common security framework may be applied to a number of different processors and hardware security module configurations.

10. The method of claim 1, wherein the secure boot process provides the processor with information needed to unlock encrypted storage, in platform configuration registers of the hardware security module, wherein platform firmware generates an audit trail in the platform configuration registers of the hardware security module which is needed to unlock secrets from the hardware security module which, in turn, are needed to decrypt the encrypted storage.

11. The method of claim 10, wherein the information needed to unlock encrypted storage is associated with at least one of: (i) a password, and (ii) an encryption key.

12. The method of claim 1, wherein the secure boot process provides the processor with a basic input output system that stores static root-of-trust measurements, needed to ensure the integrity of boot objects, in platform configuration registers of the hardware security module.

13. A method for an overall chain-of-trust associated with an industrial control system, comprising:
providing secure hardware, including a trusted platform module coupled to or integrated with a processor of the industrial control system to provide a hardware root-of-trust, wherein the secure boot includes an input output memory management unit and a capability to disable non-essential input output paths, including debug ports;
providing secure firmware associated with a secure boot mechanism such that the processor executes a trusted operating system, wherein the secure boot mechanism includes one or more of a measured boot, a trusted boot, and a protected boot;
accessing objects via secure data storage, wherein the secure data storage is associated with at least one of: (i) an encrypted store, and (ii) private cryptographic keys stored in the trusted platform module;
exchanging data via secure communications in accordance with information stored in the trusted platform model;
selecting the trusted platform module from a trusted supply chain component entity;
wherein the industrial control system is a distributed industrial control system and the hardware security module is associated with an industrial control system controller that utilizes public key infrastructure services to issue and manage certificates for code signing of software and firmware on components of the industrial control system, and the method further comprising:
deploying security updates for the industrial control system using package code signing tools that include signature information integrated with run-time signature verification mechanisms with appropriate public keys and correspond to private signing keys; and
implementing security policies to facilitate confidentiality, integrity, and availability of the industrial control system; and
wherein a security architecture treats related information that shares a security policy as a uniform security domain and further wherein applications executed by the industrial control system are hardened against a plurality of attack vectors via implementation of network and device communications, adaptation of secure communication protocols, penetration testing, and third-party certification of the industrial control system in connection with the applications being executed.

14. A system associated with an overall chain-of-trust for an industrial control system, comprising:
a hardware security module; and
a processor in communication with the hardware security module, wherein a secure audit trail about a firmware and software stack to be run on a processor of the industrial control system is established, wherein objects are store in secure storage of the industrial control system in accordance with the secure audit trail, and the processor is configured to:
secure, in the hardware security module coupled to or integrated with the processor of the industrial control system, keys used to access the secure storage,
boot using a secure boot process, and
execute a trusted operating system from the software and firmware stack to configure low-level industrial control platform hardware into a known, trusted run-time environment;
wherein the hardware security module is selected from a trusted supply chain component entity;
wherein the industrial control system is a distributed industrial control system and the hardware security module is associated with an industrial control system controller that utilizes public key infrastructure services to issue and manage certificates for code signing of software and firmware on components of the industrial control system, and further configured to:
deploy security updates for the industrial control system using package code signing tools that include signature information integrated with run-time signature verification mechanisms with appropriate public keys and correspond to private signing keys; and
implement security policies to facilitate confidentiality, integrity, and availability of the industrial control system
wherein a security architecture treats related information that shares a security policy as a uniform security domain; and deploy security updates for the industrial control system using package code signing tools that include signature information integrated with run-time signature verification mechanisms with appropriate public keys and correspond to private signing keys;

wherein the processor is further configured to implement security policies to facilitate confidentiality, integrity, and availability of the industrial control system; and wherein applications executed by the industrial control system are hardened against a plurality of attack vectors via implementation of network and device communications, adaptation of secure communication protocols, penetration testing, and third-party certification of the industrial control system in connection with the applications being executed.

15. The system of claim 14, wherein the hardware security module comprises a trusted platform module that includes:

platform configuration registers to store:
information needed to unlock encrypted storage, and
static root-of-trust measurements needed to ensure the integrity of boot objects.

* * * * *